Feb. 29, 1972   C. BERNSTEIN   3,645,975
METHOD OF PREPARING SOLID POLYURETHANE ELASTOMERS
Filed April 8, 1968
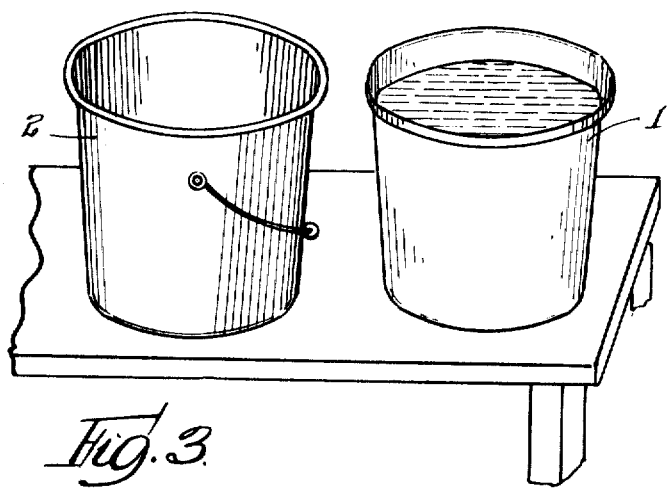
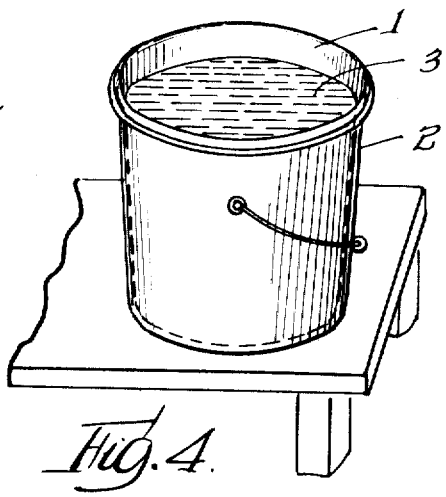
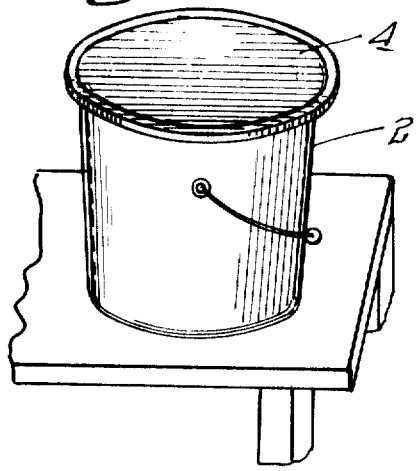
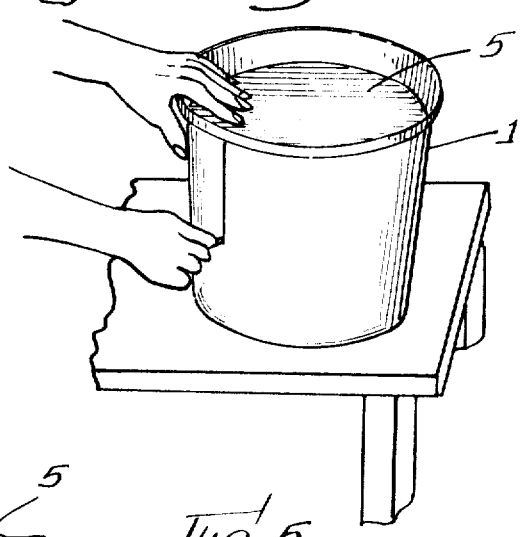
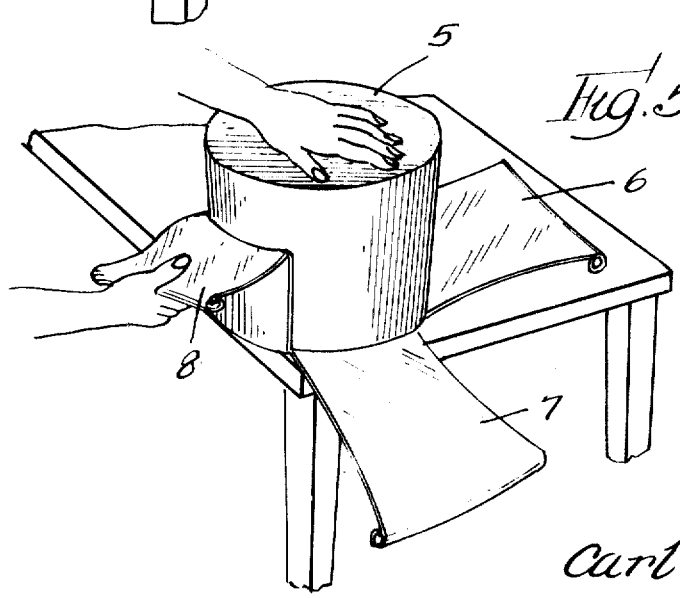
Inventor
Carl Bernstein

United States Patent Office 3,645,975
Patented Feb. 29, 1972

3,645,975
METHOD OF PREPARING SOLID
POLYURETHANE ELASTOMERS
Carl Bernstein, Deerfield, Ill., assignor to Witco
Chemical Corporation, New York, N.Y.
Filed Apr. 8, 1968, Ser. No. 719,415
Int. Cl. B65b 11/00; C08g 53/00
U.S. Cl. 260—75 NE
10 Claims

ABSTRACT OF THE DISCLOSURE

Unvulcanized, solid polyurethane elastomers are prepared by reacting an admixture of active-hydrogen-containing linear polyether or polyester polymers or branched-chain derivatives thereof, organic diisocyanates, and such other ingredients as may be required, such as chain-extenders, in a thin-walled, preformed polyethylene reaction container at a temperature from about 125 to 300 degrees F., the reaction mixture advantageously being protected from contact with the atmosphere until a solid polymer is formed. The plastic reaction vessel can be readily cut and stripped from the surface of the solid elastomer or the solid elastomer can be stored or shipped while still encased in the plastic reaction vessel.

---

This invention relates to an improved method for the preparation of unvulcanized, solid polyurethane elastomers.

The development of polyurethane elastomers or rubbers has been extensively pursued over the past several year and various types of these materials have been receiving a growing commercial acceptance as their superior properties are found useful in a wide scope of new applications. Unvulcanized polyurethane elastomers are generally commercially available in grades that range from pourable liquids to solid gums that may be compounded on conventional rubber equipment such as two-roll rubber mills and Banbury mixers and then cured or vulcanized under heat and pressure using conventional rubber curing agents such as sulfur and the like. Generally, the unvulcanized urethane elastomers are the reaction products of an active-hydrogen-containing linear polymer or branched-chain derivatives thereof and a polyisocyanate, usually an organic diisocyanate, the proportions and types of active-hydrogen-containing linear polymer, diisocyanate and other ingredients that may be employed usually depending on the curing methods that are to be utilized in the preparation of the finished elastomeric product and the desired properties of this product.

Linear polymers or branched-chain derivatives thereof containing active-hydrogens that have been used are, for example, polyesters containing at least two functional groups such as hydroxyl, carboxyl and thiol radicals and having a molecular weight generally of at least 500, and polyethers such as polyalkylene ether glycols having a molecular weight of at least 750 and containing at least two terminal hydroxyl groups. Various polyurethane elastomers derived from these reaction products have been disclosed in numerous patents, illustrative of which are U.S. Pats. Nos. 2,625,531; 2,625,532; 2,625,535; 2,760,-953; 2,808,391; 2,929,800; 2,948,691; 3,043,807 and 3,214,411.

The linear polymer polyisocyanate reaction products are, in many cases, as, for instance, disclosed in U.S. Pats. Nos. 2,808,391; 3,043,807; and 3,214,411, formed into solid polymers by heating a homogeneous mixture of the reactants until the particular reaction product solidifies and the solid product is then stored or transported for final processing into the finished products. To prevent the solidifying elastomer product from adhering to the surfaces of the reaction vessel, it is necessary to use release agents such as silicones, Teflon and the like, and the problems associated with this phase of the manufacture of solid polyurethane elastomers are time-consuming and costly, particularly when the solid elastomer is being prepared for shipment to outside customers.

In accordance with the present invention, I have discovered an improved method of preparing unvulcanized, solid polyurethane elastomers which comprises heating an active-hydrogen-containing linear polymer and/or branched-chain derivatives thereof having a molecular weight of at least 500 and a polyisocyanate until all reactants have been incorporated and thoroughly mixed, preferably in a mixing vessel, then transferring the reactants to a preformed thin-walled polyethylene container, and then heating said reaction mixture at a temperature from about 125 to 300 degrees F., advantageously while protecting said reaction mixtures from contact with the atmosphere and preventing evaporation of the reactants, until a solid elastomeric reaction product is formed. While, in most instances, the mixing together of the reactants, prior to reacting the same at elevated temperatures to produce the solid polyurethane elastomers, will be done in a separate relatively large mixer, from which a plurality of the polyethylene reaction containers will be filled, it is within the scope of my invention to effect both the initial mixing of the reactants and the subsequent heating thereof to produce the solid polyurethane elastomer in the polyethylene reaction container.

The unvulcanized, solid polyurethane elastomer encased in the polyethylene reaction container can then be stored for future use, or transported to other locations in standard shipping containers and the polyethylene casing may be readily stripped from the elastomer surface making said solid elastomer available for further processing. The need for employing mold release compounds or specially coated reactors in which to complete the reaction and prepare the solid elastomer has been totally eliminated in addition to which no special handling is required for storage, shipping or preparing the elastomer for final processing.

The present invention contemplates the use of a polyethylene reaction container capable of retaining the reactants employed in the preparation of solid polyurethane elastomers under the conditions of temperature to which it may be subjected during the reaction after which the reaction container may, due to its non-adherent characteristics, be readily removed from the surface of the solid elastomer.

The polyethylene reaction containers which are utilized in accordance, with the present invention are thin-walled, self-supporting containers of various shapes and sizes. They are inert to the reactants contained therein, have sufficient heat resistance to withstand the temperature encountered during the reaction, exhibit low permeability to the reactant vapors and may be readily stripped from the surface of the solid polyurethane elastomer. Most suitable and especially preferred are the high density polyethylene.

Other suitable reaction containers are those prepared from polyethylene laminated to metal foil, paper or other cellulosic material, and the like wherein the polyethylene forms the interior surfaces of the container.

The wall thickness of the preformed container can vary widely but, generally, the minimum thickness should be about 0.010 inch to afford the container self-supporting characteristics. Too thin a film or a container that collapses during the time when reactants are added will commonly fold into the reactants and become imbedded therein making it very difficult to remove from the solidified elastomer. In addition, gas permeability characteristics of a very thin film generally tend to be unsatisfactory.

The use of various plastic materials for various packaging is, of course, widely known and it is further known to use plastic or other films as release agents in certain molding operations as disclosed, for instance, in U.S. Pats. Nos. 3,158,906 and 3,325,861. Such practices are, however, distinct from the concepts and teachings of my present invention. So far as I am aware, no method is known in or has been suggested by the art, in connection with the preparation of unvulcanized solid polyurethane elastomers, wherein a preformed thin-wall polyethylene container is employed as a reaction vessel to be used at elevated temperatures for the production of the solid elastomer, and then serves as a storage or shipping container that is readily removable from the surface of the solid elastomer formed therein.

The polyethylene reaction vessel-container used pursuant to the present invention may advantageously be employed as a liner for standard commercial metal, wood or cardboard containers, and particularly a container provided with a means for sealing the contents so that the reaction is carried out while being protected from contact with the atmosphere and loss of volatile reactants.

In general, any solid polyurethane elastomer may be prepared in accordance with the practice of the present invention. Examples of such solid polyurethane elastomers are, for instance, the sulfur curable, millable elastomers disclosed in U.S. Pats. Nos. 2,808,391 and 3,043,807. Thus, in said Pat. No. 2,808,391, solid polyurethane elastomers are prepared by reacting a polymeric glycol, such as a polyalkylene ether glycol, an organic diisocyanate and a low molecular weight, non-polymeric glycol, the ratio of diisocyanate to the sum of the polymeric and non-polymeric glycols being substantially equimolar, to provide side chains on the polyurethane elastomer polymer which contain aliphatic $$-\overset{|}{C}=\overset{|}{C}- \text{ groups}$$

as potential curing sites for use with a sulfur curing procedure; these side chains may be present on any one of the reactants which are used. The polymeric glycols used have molecular weights of at least 750 and may be as high as about 10,000. When polymeric glycols having side chains containing aliphatic

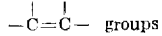 groups are employed in the reaction, the molecular weight of the polymeric glycol is, of course, increased by the molecular weight of the side chain groups. In general, any low molecular weight, non-polymeric glycol, i.e. one having a molecular weight below about 200, may be used as one of the reactants, and they may have side chains containing the aliphatic

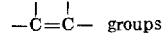 groups

As described in said Pat. No. 2,808,391, the reaction between the above-noted reactants is carried out at a temperature from about 155 to 250 degrees F. until substantially all of the isocyanate groups have reacted with the hydroxyl groups of the glycol, the reaction being carried out under agitation and under substantially anhydrous conditions. The resulting homogeneous mass is then poured into a vessel coated with a compound to prevent adhesion of the polymer to the surface of the vessel and maintained at a temperature between about 155 to 250 degrees F. under anhydrous conditions until all of the isocyanate groups have reacted with the hydroxyl groups of the glycols and a solid polyurethane elastomer has been prepared. After cooling, the solid elastomer is removed from the reaction vessel for storage or further processing into finished product.

In the aforesaid Pat. No. 3,043,807, solid uncured polyurethane elastomers are prepared which can be vulcanized using sulfur and other conventional rubber curing systems. An active-hydrogen-containing linear polyester having a molecular weight of from 900 to 5,000, having a pendant or extra-linear group which contains an aliphatic

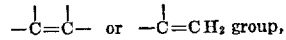

is reacted with an organic diisocyanate or, alternatively, the active-hydrogen-containing linear polyester is reacted with an organic diisocyanate containing pendant unsaturation groups, or, alternatively, a third component containing pendant unsaturation groups can be added to the reaction batch containing the linear polyester and organic diisocyanate, the molar ratio of reactant components being from 0.95 to 1.05 mols of diisocyanate to 1 mol of other components. The reactants are mixed and heated at a temperature from 175 to 195 degrees F. until a homogeneous mixture has been prepared after which time the reaction batch is poured into a vessel treated to keep the solid polymer from adhering to its walls. The reaction vessel and contents are covered to prevent contact with the atmosphere, and escape of volatile reactants and then heated at temperatures ranging from 125 to 300 degrees F. until a solid elastomer of suitable plasticity has been obtained. After cooling, the solid elastomer is removed from the reaction vessel and prepared for further processing or storage.

Unvulcanized soild polyurethane elastomer compositions of the type described hereinabove, when prepared in accordance with the practice of the present invention wherein the admixture of reactants is poured into a preformed, thin-walled polyethylene reaction container, and then heated therein to effect the reaction to produce the solid elastic polymers, results in eliminating the need for surface treatment of the reaction vessel as well as the need for removing the elastomer from the reaction container to prepare for storage or shipping since the polyethylene container employed as the reaction vessel is quite suitable for either purpose.

Other uncured solid polyurethane elastomers that may be prepared in accordance with the present invention are solid polyurethane elastomers that are processable by convention thermoplastic techniques as disclosed, for example, in U.S. Pat. No. 3,214,411. These solid polyurethane elastomers are made by reacting an hydroxyl polyester, prepared by condensing adipic acid and a glycol or mixture of glycols having at least one primary hydroxyl group to an acid number of from about 0.5 to about 2.0 and a water content less than about 0.2% with 4,4'-diphenylmethane diisocyanate containing less than 5% of 2,4'-diphenyl and less than about 2% of the dimer of 4,4'-diphenylmethane diisocyanate and a chain extending agent having active hydrogen containing groups reactive with isocyanate groups. Generally, the reaction is carried out at a temperature of from about 140° F. to about 275° F. until a homogeneous mixture is formed after which the reaction mixture is conducted onto a suitable heated surface and maintained at a temperature of from about 140° F. to about 275° F. until it solidifies. The solidified elastomer is then removed from the heated surface while still warm so that the product can be cut for easier handling.

When, however, in accordance with my present invention, the reaction mixture of said Pat. No. 3,214,411 is placed into a preformed high density polyethylene reaction container and then heated until solidified, the resulting product may be stored or shipped without undue difficulty and the said container can be readily stripped from the solid elastomer when further processing is to be carried out.

Other advantages and features of the invention will become more particularly apparent in the light of the drawings wherein:

FIG. 1 is a perspective view of an embodiment of a preformed polyethylene reaction container and a standard commercial metal shipping container;

FIG. 2 is a perspective view of the embodiment of FIG. 1 showing the polyethylene reaction container inserted in the standard metal shipping container;

FIG. 3 is a perspective view of the embodiment of FIGS. 1 and 2 showing the polyethylene reaction container inserted in the shipping and supporting container sealed to protect the contents from contact with the atmosphere;

FIG. 4 is a perspective view of the embodiment of FIGS. 1 and 2 showing the preformed polyethylene reaction container and solidified polyurethane elastomer; and FIG. 5 is a perspective view of the embodiment of FIGS. 1 and 2 showing the preformed polyethylene reaction container and solidified polyurethane elastomer wherein sections of the polyethylene container have been cut away and partially stripping from the solid elastomer.

Referring now, in greater detail to the drawings, in FIG. 1 there is illustrated a preformed polyethylene reaction container 1 and a standard commercial metal supporting container 2. In FIG. 2, the polyethylene reaction container 1 has been filled with the reactants 3 for making the polyurethane elastomer and said container 1 has been inserted into the metal supporting container 2 and substantially conforms to the shape of the metal container 2. In FIG. 3, the polyurethane reaction batch 3 has been cast into the polyethylene container 1 supported by the metal container 2 and a cover 4 has been clamped in place to protect the contents from contact with the atmosphere, this assembly being suitable for carrying out the reaction to prepare the solid polyurethane elastomers. In FIG. 4, the preformed polyethylene reaction container 1 containing solidified polyurethane elastomer 5 has been removed from its supporting metal container 2; and, in FIG. 5, sections 6, 7 and 8 of the polyethylene container 1 have been cut away and stripped from the surface of the solidified polyurethane elastomer 5, section 8 being shown partially stripped away.

The practice of my invention is further illustrated by the following examples in which, unless otherwise specified, parts are shown by weight, and the temperatures recited are in ° F. The invention is not intended to be limited by these examples which are illustrative rather than restrictive of the scope of the invention.

EXAMPLE 1

A polyester prepared from the condensation reaction of 3210 parts adipic acid, 1480 parts of ethylene glycol and 348 parts of glycerol-alpha-allyl ether having an acid number of 0.9 and hydroxyl number of 58.5 was used in this example.

1000 parts of polyester was mixed with 140 parts of 4,4'-tolidine diisocyanate of 100% purity and heated to about 210° after which 5 parts of phenyl-beta-naphthylamine was added and mixing was continued until a homogeneous reaction batch was obtained. The reaction mixture was then poured into a 5 gallon container molded from high density polyethylene to a level about 1" below the top edge. A polyethylene cover was then placed over the container and contents and the mixture was baked in an oven for about 10 hours at a temperature between about 205° and 215° after which time it was found that a solid elastomer was formed.

After cooling the polyethylene reaction container was readily cut and then stripped from the surface of the elastomer.

The elastomer was compounded on a two-roll rubber mill and satisfactorily vulcanized with a sulfur curing system.

EXAMPLE 2

100 parts of a polyester prepared from the condensation of one mol of adipic acid, 0.96 mol of ethylene glycol and 0.24 mol of propylene glycol-1,2, having an hydroxyl number of 50 and an acid number of 0.5, was mixed with 5 parts of trimethylol propane mono allyl ethyl ether and 1 part of 2,6-di-tert-butyl-4-methyl phenol.

The mixture was heated to about 120° after which 12.8 parts of an 80:20 mixture of 2,4-tolylene diisocyanate and 2,6-tolylene diisocyanate of 100% purity was added and the heated mixture was mixed until homogeneous. The mixture was then poured into a standard commercial 5 gallon steel can in which had been inserted a high density polyethylene preformed container that generally conformed to the interior contours of the 5 gallon can and had a wall thickness of about 0.0105", the said container being filled with reaction mixture to a level about 1" below the top edge. A cover which was supplied with the 5 gallon can was placed over the can and held in place with the standard ring clamp supplied with the can. The can and contents were then placed in an oven and baked for about 20 hours at a temperature between about 200° and 220° until the reaction was completed and a solid elastomer had formed.

The batch was cooled to room temperature, the cover was removed from the can and the solid polyurethane elastomer encased in the polyethylene container was easily removed from the metal can. The metal can had not been damaged and could be reused again, either as a supporting container for the next batch of elastomer or as a shipping container for the polyethylene encased polyurethane elastomer. The polyethylene casing was readily cut and then stripped from the block of said polyurethane elastomer which appeared uniform throughout and exhibited no tacky or soft surface condition.

The elastomer was compounded on a two-roll rubber mill and vulcanized with a sulfur curing system.

EXAMPLE 3

100 parts of the polyester of Example 2 was mixed with 3.8 parts of glycerol-alpha-allyl-ether and 0.5 part of phenyl-beta-naphthylamine and heated to about 120° after which 12.8 parts of 2,4-tolylene diisocyanate of 100% purity was added and the heated mixture was mixed until homogeneous. The mixture was poured into a commercial 5 gallon steel can containing a molded high density polyethylene insert that generally conformed to the interior contours of the can. The can cover was fastened in place and the can and contents were baked in an oven for about 7 hours at a temperature between about 245° and 255°. After cooling, the solid elastomer encased in plastic was easily removed from the can and the plastic casing was readily cut and then stripped from the surface of the elastomer.

While certain representative embodiments and details of the present invention have been disclosed, other forms thereof will readily suggest themselves to those skilled in the art in the light of this disclosure and, therefore, the present invention is to be limited only by the scope of the appended claims.

What is claimed is:

1. A method of preparing and packaging an unvulcanized solid polyurethane elastomer which comprises providing an admixture of an active-hydrogen-containing linear polymer and branched-chain derivatives thereof and an organic polyisocyanate, then, while said reactants are contained in a preformed, thin-walled reaction container, made from polyethylene, the surface of which is not coated with a separate mold release agent, heating said reaction mixture to produce said solid elastomer while covering said reaction mixture to protect it from substantial evaporation of said reactants.

2. A method in accordance with claim 1 wherein said reaction container, during the heating of the reaction mixture, is disposed in a supporting container having content sealing means, said reaction container closely conforming to the interior walls of said supporting container.

3. A method in accordance with claim 1 wherein said reaction container has a wall thickness of at least about 0.01 inch and is essentially self-supporting.

4. A method in accordance with claim 1 wherein the reaction container is made of said polyethylene laminated to a material selected from the group consisting of metal foil and cellulosic material, the polyethylene being in contact with said reactants.

5. A method in accordance with claim 2 wherein said reaction container is molded from high density polyethylene.

6. A method in accordance with claim 3 wherein said active-hydrogen-containing linear polymer is a polymer selected from the group consisting of a polyester containing at least two functional groups and a molecular weight of at least 500 and a polyether containing at least two terminal hydroxyl groups and a molecular weight of at least 750, and said organic polyisocyanate is an organic diisocyanate.

7. The method of claim 6 wherein said reaction mixture is heated at a temperature from about 125 degrees to 300 degrees F.

8. An article comprising a unitary solid body of noncellular unvulcanized polyurethane elastomer for processing by milling, curing and vulcanizing having a removable thin-walled outer covering made from polyethylene, said covering being in direct contact with one end and with the sides of said solid elastomer body and being removable from said solid body by cutting and tearing means, said article being prepared by the method which comprises placing an admixture of an active-hydrogen-containing linear polymer and branched-chain derivatives thereof and an organic polyisocyanate into a thin-walled reaction container made from polyethylene, the inner surface of which container is not coated with a separate mold release agent, then heating said reaction mixture in said container to produce said solid elastomer while covering said reaction mixture to protect it from substantial evaporation of said reactants.

9. The article of claim 8 wherein said organic plastic reaction container is made of high density polyethylene and has a wall thickness of at least about 0.01 inch.

10. The article of claim 9 wherein said active-hydrogen-containing linear polymer is a polymer selected from the group consisting of a polyester containing at least two functional groups and a molecular weight of at least 500 and a polyether containing at least two terminal hydroxyl groups and a molecular weight of at least 750, and said organic polyisocyanate is an organic diisocyanate.

References Cited

UNITED STATES PATENTS

| | | | |
|---|---|---|---|
| 1,391,969 | 9/1921 | Overbury et al. | 206—84 X |
| 2,310,712 | 2/1943 | Schmied | 206—84 |
| 2,338,607 | 1/1944 | Wacker | 18—55 |
| 2,352,865 | 7/1944 | Smith | 220—64 |
| 2,690,255 | 9/1954 | Kaiser et al. | 206—84 |
| 2,850,467 | 9/1958 | Livingood | 260—2.5 |
| 3,100,676 | 8/1963 | Christie | 18—58 |
| 3,100,759 | 8/1963 | Boussu et al. | 260—77.5 |
| 3,114,597 | 12/1963 | Lee | 18—58 |
| 3,341,646 | 9/1967 | Britain | 264—213 |
| 2,956,310 | 10/1960 | Roop et al. | 18—57 |
| 3,011,218 | 12/1961 | Mitten | 18—59 |

OTHER REFERENCES

Condensed Chemical Dictionary—5th ed., Reinhold, New York (1956), p. 871, call No. QD5C5.

DONALD E. CZAJA, Primary Examiner

H. S. COCKERAM, Assistant Examiner

U.S. Cl. X.R.

53—36; 260—77.5 AA